Oct. 20, 1931.  F. E. GARBUTT  1,828,364
FILM CONTACT SYSTEM
Filed Jan. 18, 1928  2 Sheets-Sheet 1
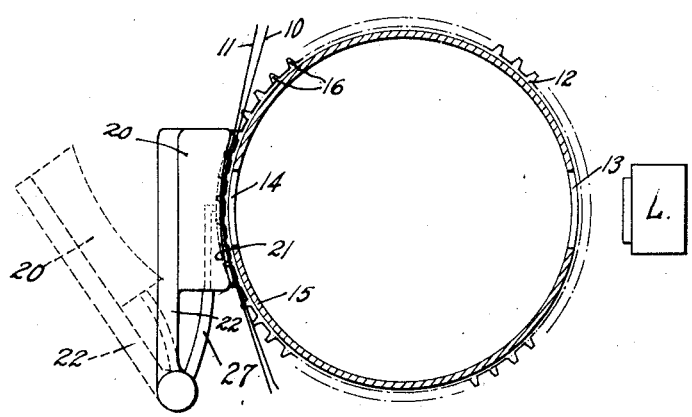
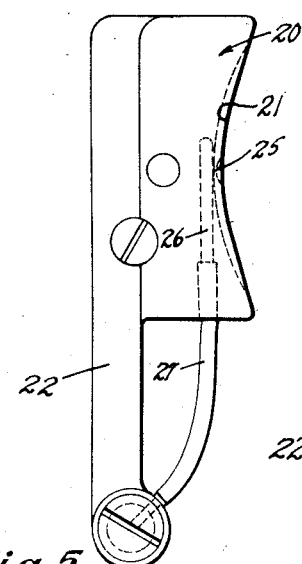
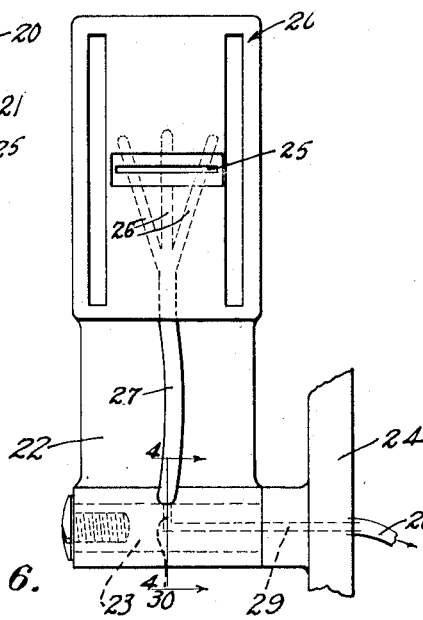
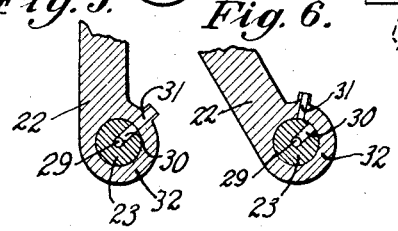
Inventor
Frank E. Garbutt.
Attorney.

Oct. 20, 1931.    F. E. GARBUTT    1,828,364
FILM CONTACT SYSTEM
Filed Jan. 18, 1928    2 Sheets-Sheet 2
*Fig. 7*
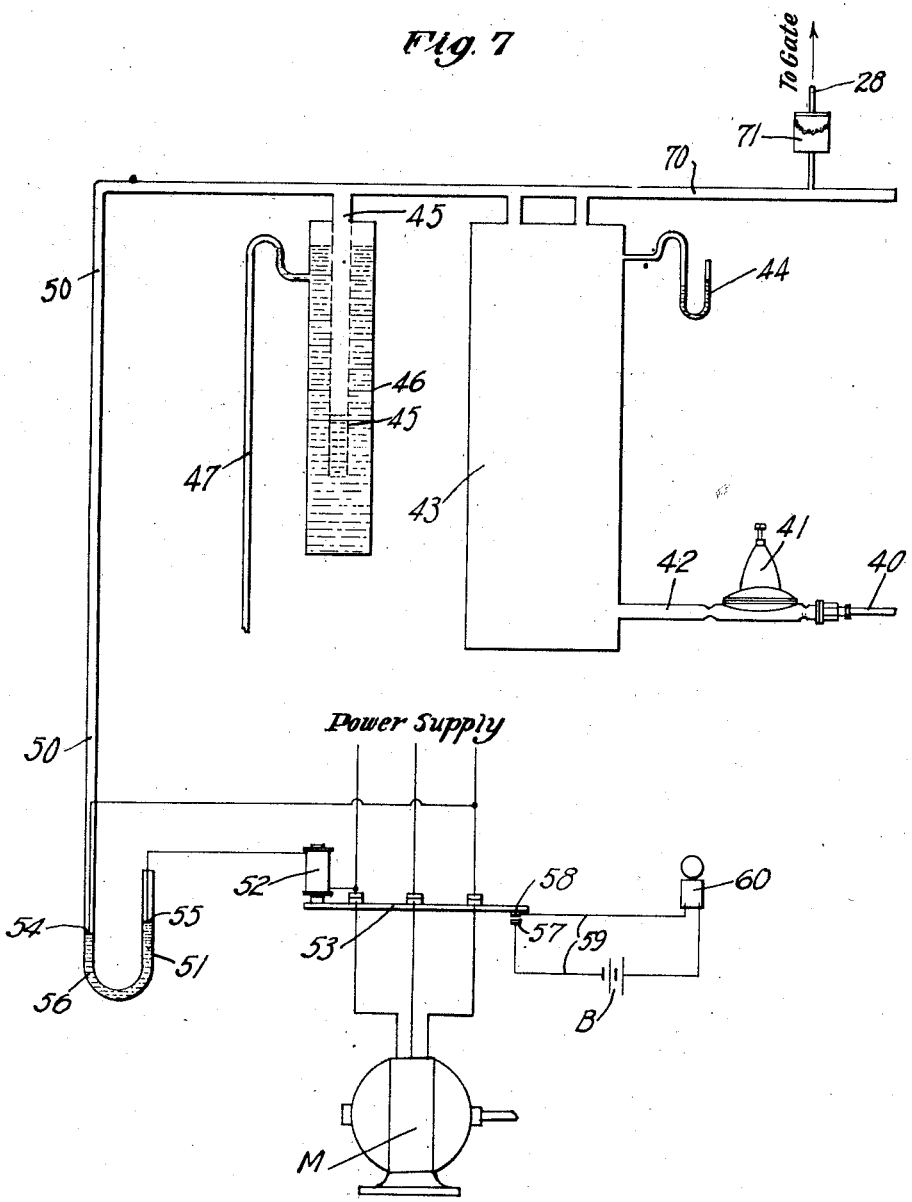
Inventor
Frank E. Garbutt
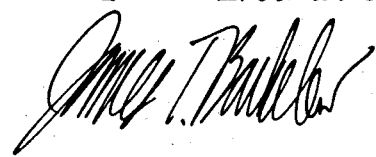
Attorney Patented Oct. 20, 1931

1,828,364

UNITED STATES PATENT OFFICE

FRANK E. GARBUTT, OF HOLLYWOOD, CALIFORNIA, ASSIGNOR TO PARAMOUNT PUBLIX CORPORATION, A CORPORATION OF NEW YORK

FILM CONTACT SYSTEM

Application filed January 18, 1928. Serial No. 247,586.

This invention has to do with printers for motion picture film and the like, and is particularly concerned with improvements in the system of printing by contact.

With film printing systems heretofore in use, a substantial loss of definition has always been introduced in printing motion picture film. This effect is apt to vary in magnitude along the film, resulting in irregularity and frequent fading of detail. And particularly in printing a positive, for instance, of a dark scene, in which case the negative is very light, the picture often fades to such an extent that the obtaining of a suitable print is entirely impossible.

This loss of definition is due primarily to the difficulty of maintaining perfect contact and registration of the two films. Various means have been devised to maintain contact and also to maintain registration, but heretofore these ends have not been simultaneously reached in a satisfactory manner.

My invention provides a means of maintaining perfect contact and register of the two films at the area of printing. I do this by providing an air pressure system in connection with the printer, and directing a current of air against the films in such a manner that the films are held in perfect contact against the registering means upon which they are supported.

A better understanding of the invention will be obtained from the following detailed description of a system and apparatus suitable for carrying the invention into effect. The particular elements of this embodiment are not to be construed, however, as being limitative upon the invention, but merely as being illustrative of suitable means to practice the system.

In the drawings:

Fig. 1 shows a developed and a raw film being pressed in contact against their registering and supporting means in accordance with the invention;

Fig. 2 is an enlarged view showing the films positioned upon their registering and supporting means;

Fig. 3 is a side elevation of the aperture gate;

Fig. 4 is a view in front elevation showing the aperture gate mounted upon the frame of the printer;

Fig. 5 is a section on line 4—4 of Fig. 4;

Fig. 6 is a view similar to Fig. 5, but with the aperture gate moved to the inoperative position, indicated in dotted lines in Fig. 1;

Fig. 7 is a diagrammatic drawing of the air pressure system and electric controls.

For simplicity of explanation, it will be hereinafter assumed that a positive is to be printed from a negative, it being understood that a negative is printed from a positive in exactly the same manner.

With particular reference to Fig. 1, the negative film 10 and positive film 11 are supported face to face in a curved plane upon suitable registering means, as upon the sprocket wheel 12. The films are illuminated by the printing light L which transmits light through apertures 13 and 14 in the cylindric shield 15. Sprocket wheel 12 is driven in any convenient manner, and is provided with teeth 16 which fit into the film perforations, thus registering as well as moving the films. These teeth are carefully machined to fit snugly into the perforations, and support the films as shown in Fig. 2.

Backing up the films opposite aperture 14 is the gate 20. Gate 20 has a concave face 21 whose curvature conforms to that of sprocket wheel 12 and is carried upon a swinging arm 22 rotatably mounted upon the stud 23 projecting from the printer frame 24. Gate 20 is provided with an air passage having an outlet in its face 21 opposite the aperture 14. In the gate shown in the drawings, this is accomplished by providing in face 21 an air outlet aperture or slot 25 transversely to the films and directly opposite the light aperture 14. Slot 25 communicates by means of drill holes 26 to the air tube 27.

When the printer is not in operation, the gate 20 is swung to its inoperative position, indicated in dotted line in Fig. 1. For the purpose of providing a means of cutting off the air supply when the gate is in this position, the following arrangement is provided. Air inlet tube 28 is connected to the air passage 29 extending through frame 24 and centrally and longitudinally through stud 23. A drill hole 30 extends radially from the surface of the stud 23 to the central air passage 29, as shown in Figs. 4 and 5, and in register with the hole 30 when the arm is in its operative position, that of Fig. 5, is a corresponding hole 31 extending radially through the hub 32 of arm 22. Air tube 27 is then connected to the outlet of hole 31, thus completing an air passage from air tube 28 to the slot 25 in the face 21 of the gate. When the aperture gate 20 is swung to its inoperative position, as indicated in dotted line in Fig. 1, the holes 30 and 31 in the stud and hub respectively move out of register, as in Fig. 6, and the air supply is cut off.

The air pressure and electrical system are shown in diagram in Fig. 7. Air under pressure is received through pipe 40 and is reduced to approximately one and one-half pounds by the pressure regulator 41. One and one-half pounds has been found by experiment to be suitable for the specific apparatus herein shown, but other pressures will of course be required for variational apparatus. Pipe 42 conducts the air to a storage tank 43. A mercury U-tube 44 is connected to tank 43 for the purpose of indicating the pressure of the air in the system. Communicating with tank 43 is a downwardly extending pipe 45, and surrounding this pipe is an open water tank 46. The height of the water in the tank 46 above the bottom of the pipe is so proportioned that, with a normal air pressure of one and one-half pounds in the tank 43, for instance, the water will extend upwardly into the pipe 45 to a certain height and the air cannot escape; but if the air pressure exceeds a predetermined amount, the air will force the water out of pipe 45 and will escape upwardly through the water in the tank. A water outlet pipe 47 is provided in the side of tank 46, the height of this pipe being adjusted to maintain just the height of water necessary to effect the air escape at the predetermined maximum allowable pressure. This air escape safety device precludes any possibility of injury to the film in case of an undue increase in pressure.

As a secondary precaution, means is provided for automatically cutting off the supply of electricity to the printer motors and thus stopping the motion of the films whenever the pressure either rises or falls beyond predetermined limits. Communicating with tank 43 is pipe 50 having at its end the open mercury U tube 51. In series with solenoid 52, which holds circuit breaker 53 closed, are two platinum contacts or electrodes 54 and 55, dipping into the surfaces of the mercury 56 in the arms of the U-tube 51. When the pressure in the system changes, the mercury in one arm will raise about its platinum contact, while the mercury in the other arm will lower about its contact, and if the pressure change is sufficient, the mercury in the latter arm will descend until contact between the electrode and the mercury is broken. The solenoid 52 is thus de-energized, the circuit breaker 53 opens and the printer motors, such as motor M, stop. A stationary electrical contact 57 and a corresponding contact 58 situated on the circuit breaker 53 are provided in an auxiliary circuit 59 which includes battery B and bell 60. When the circuit breaker 53 opens the contacts 57 and 58 are closed, ringing the bell 60 which notifies the operator immediately that his power is off.

A single air pressure system and electrical controls such as has just been described may be connected to a number of printing machines. A pipe 70 leading from storage tank 43 communicates with the air tubes 28 of the various printers. An air cleaner 71 is provided at a convenient point in each air tube so that no dirt will be blown against the film. This air cleaner may conveniently consist of a silk bag or other fine mesh fabric through which the air must pass on its way to the gate.

It is recognized that air pressure has been previously used to cause a better contact of the films, but heretofore this has always been applied to the concave surface of the curved plane to which the films conform in passing over their registering and driving sprocket. The effect of thus applying an air pressure is to move the films slightly away from a tight fit upon the sprocket teeth, and thus to lose the effect of perfect registration which may only be obtained by causing the films to fit tightly against the sprocket wheel with the sprocket teeth fitting snugly into the perforations. Another disadvantage of applying air pressure in this manner is that the films are often scratched by being rubbed against the gate.

My invention, in providing means of applying air pressure to the convex instead of the concave surface of the films, obviates these difficulties and permits the obtainment of greatly improved prints. As indicated in Fig. 2, the films are pressed into perfect contact and are forced upon the sprocket teeth, thus insuring a snug fit and the best possible registration. The natural rigidity of the films prevents them from buckling between the teeth of the sprocket wheel from the maximum air pressure that is used. Before sufficient pressure to cause buckling or to injure the film in any way is reached, the water safety valve allows air to escape and the electric drive is opened, stopping the machine, as was previously explained.

Printing is thus accomplished under the best possible conditions. The films, which are disposed in a curved plane upon their registering means, are pressed from their convex surface thus forcing them in tight contact snugly down in perfect register upon the teeth of the sprocket wheel. And due to the safety devices the printer can only operate when the air pressure is at the proper value for best results.

Other arrangements of the various elements of the system will be obvious to those skilled in the art, and all such equivalent variations are contemplated within the scope of the invention. While I have specified air pressure, any suitable fluid substance may be substituted for air, if desired. And various forms of aperture gates, sprockets, etc., may be utilized while practicing the invention. I therefore desire to reserve to myself all such variations and improvements as are included within the following claims:

I claim:

1. In a system of photographic printing by the contact method, a sprocket wheel having teeth adapted to fit into the perforations of a developed and a raw film disposed face to face, the two films being registered and supported in a curved plane upon the said teeth, a fluid pressure system, means for exerting said fluid pressure to an area of the films from their convex surface in such a manner that the films are held in contact and register against the teeth of the sprocket wheel within said area, the pressure being just sufficient to maintain contact of the films and to seat them snugly upon the sprocket teeth without causing buckling of the films between the teeth, means for allowing fluid to escape from the system when the fluid pressure rises above a predetermined maximum, and means for illuminating a portion of the developed film within the area under pressure so that light will be transmitted through the developed film to print the raw film.

2. In a system of photographic printing by the contact method, a sprocket wheel having teeth adapted to fit into the perforations of a developed and a raw film traveling face to face, the two films being registered, moved, and supported in a curved plane by the teeth of the sprocket wheel, means for driving said sprocket wheel, means for exerting a fluid pressure to an area of the films from their convex surface in such a manner that the films are held in contact and register against the teeth of the sprocket wheel within this area, the pressure being just sufficient to maintain contact of the films and to seat them snugly upon the sprocket teeth without causing buckling of the films between the teeth, pressure actuated means for automatically cutting off the drive of the sprocket wheel when the pressure departs from a predetermined operating range, and means for illuminating a portion of the developed film within the area under pressure so that light will be transmitted through the developed film to print the raw film.

3. In combination with a system of photographic printing having a fluid pressure system for maintaining contact of a developed and a raw film and having an electrical circuit including a motor for driving film moving mechanism, means actuated by virtue of the fluid pressure either rising or falling from a predetermined operating range for cutting off the drive of said motor.

4. In combination with a system of photographic printing having a fluid pressure system for maintaining contact of a developed and a raw film and having an electrical circuit including a motor for driving film moving mechanism, means for automatically opening the electric circuit and stopping the drive motors when the pressure in the system departs from a predetermined operating range, said means consisting of a mercury U tube having one of its arms connected to the pressure system, an electrode dipping into the surface of the mercury in each arm, the electrodes being included in the previously mentioned electrical circuit, the mercury moving out of contact with one of the electrodes, opening the electrical circuit and stopping the motors when the internal pressure within the U tube changes sufficiently.

5. In a system of photographic printing by the contact method, means for supporing and registering a raw and a developed film face to face in a curved plane, a film gate adjacent the convex surface of the films, the film gate having an air pressure outlet designed to project air against the convex surface of the films, forcing them against the said registering and supporting means, the said film gate being movable away from the films to an inoperative position, means for automatically cutting off the air supply to the gate when the gate is moved to its inoperative position, and a source of illumination disposed opposite the surface of the developed film and adapted to transmit light therethrough to print the raw film.

6. In a system of photographic printing by the contact method, means for supporting and registering a raw and a developed film face to face in a curved plane, a film gate adjacent the convex surface of the films, the film gate having an air pressure outlet designed to project air against the convex surface of the films, forcing them against the said registering and supporting means, the said film gate being movable away from the films to an inoperative position, means for automatically cutting off the flow of air through the gate when the gate is moved to its inoperative position, and a source of illumination disposed opposite the surface of the developed film and adapted to transmit light therethrough to print the raw film.

7. In a continuous printer, the combination of a continuously rotating sprocket wheel having sprocket teeth adapted accurately to fit film perforations and to register and support films in a curved formation out of contact with other portions of the sprocket wheel, a film gate having a concave inner surface adapted to lie closely to the convex outer surface of films supported on the sprocket wheel, means in the gate for transmitting fluid under pressure to an area of said convex film surface, means to supply said pressure fluid at the gate under a pressure sufficient to hold the convex film surface away from the gate and to hold the films in mutual contact and tightly upon the sprocket teeth, but insufficient to cause film buckling between successive sprocket teeth, and means to illuminate a film within the area to which fluid pressure is applied.

In witness that I claim the foregoing I have hereunto subscribed my name this 5th day of January, 1928.

FRANK E. GARBUTT.